April 30, 1963 R. S. BURWEN 3,088,076

ELECTRONIC APPARATUS

Filed Nov. 17, 1958 2 Sheets-Sheet 1

INVENTOR.
RICHARD S. BURWEN

BY Arthur H. Swenson

ATTORNEY.

April 30, 1963 R. S. BURWEN 3,088,076

ELECTRONIC APPARATUS

Filed Nov. 17, 1958 2 Sheets-Sheet 2

INVENTOR.
RICHARD S. BURWEN

BY Arthur H. Swanson

ATTORNEY.

3,088,076
Patented Apr. 30, 1963

3,088,076

ELECTRONIC APPARATUS

Richard S. Burwen, Lexington, Mass., assignor to Minneapolis-Honeywell Regulator Company, Minneapolis, Minn., a corporaion of Delaware Filed Nov. 17, 1958, Ser. No. 774,368
13 Claims. (Cl. 330—9)

This invention relates to electronic apparatus, and more particularly to electronic amplifiers.

In a number of instances, particularly in industrial applications, there is a need for amplifiers which are capable of accurately amplifying very small signals which may vary in character from a direct current signal to alternating current signals of relatively high frequency. Because of the nature of many of the data handling and accumulating systems in current use, it is becoming increasingly important that such amplifiers be characterized with a relatively high input impedance to avoid loading the signal sources. In the art relative to industrial amplifiers it is also increasingly important that the amplifier be capable of handling a signal which is the difference in level between two signals, so-called differential signals. Since such signals are reach referenced to a common level, or ground, that is, their individual magnitudes are determined with respect to ground, we may call this portion of the signal common to both signals the common mode signal, and this common mode signal may be large relative to the differential signal. The amplifier should present little or no response to the common mode signal.

It is an object, therefore, of the present invention to provide an improved amplifier capable of handling a wide band of signals from direct current signals to alternating current signals of relatively high frequency.

It is another object of the present invention to provide an improved amplifier as set forth and which is characterized by high stability to direct current drift.

A further object of this invention is to provide an improved amplifier as set forth which features a high input impedance and little or no response to common mode signals in a differential signal input arrangement.

In accomplishing these and other objects, there has been provided, in accordance with the present invention, an amplifier which includes a balanced bridge circuit for differential signals, means for converting direct current and low frequency input signals into alternating signals, amplifying and demodulating means for such converted signals, and an output amplifier. Means are provided for coupling the output of said demodulating means to the input of the output amplifier. Means are also provided for coupling the input circuit directly to the output amplifier for alternating current signals. Balanced feedback circuits from the output of the output amplifier to the input circuit provide both stabilization and means for effecting high input impedance for the circuit.

A better understanding of this invention may be had from the following detailed description when read in connection with the accompanying drawings, in which.

Figure 1:
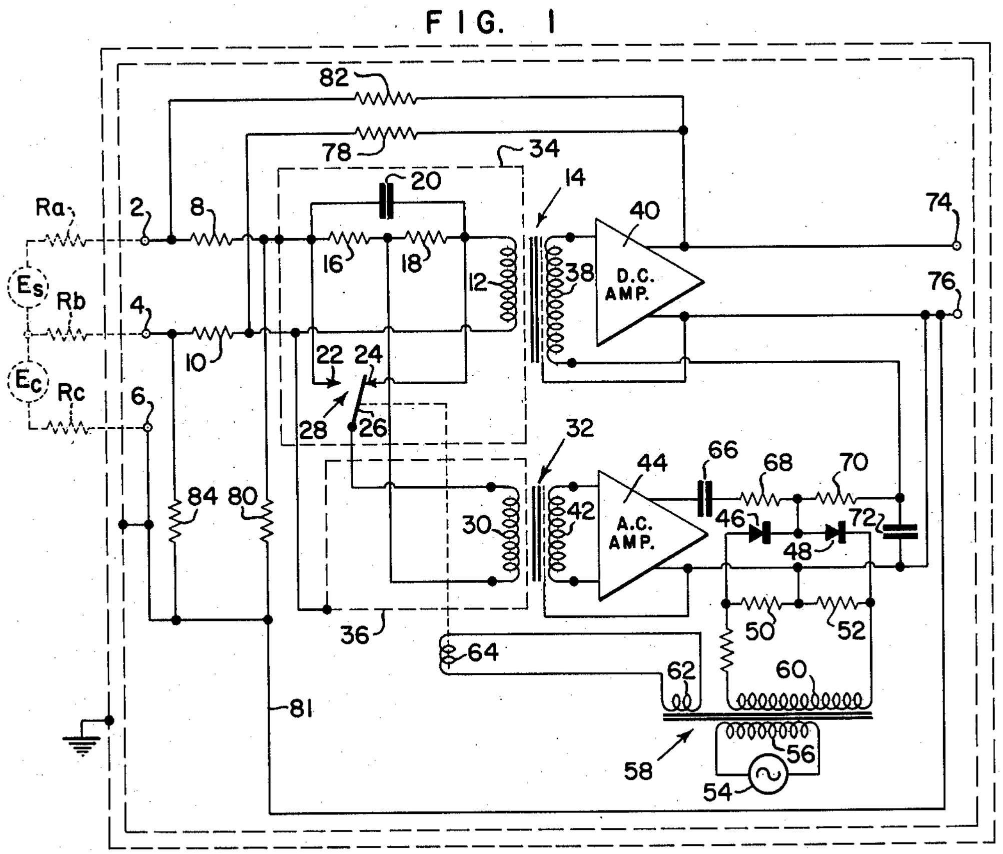
FIG. 1 is a schematic diagram illustrating the present invention.

Referring now to the drawings in more detail there is shown in FIG. 1 an amplifier having a pair of signal input terminals 2 and 4 and a common terminal 6. The signal input terminals 2 and 4 are arranged for connection to the signal output terminal of a primary sensing means such as a strain gage or a thermocouple while the common terminal may be connected to the common ground or ground connection of the primary element. An input resistor 8 is serially connected between the signal input terminal 2 and the input circuit of the amplifier. Similarly, a second input resistor 10 is serially connected between the signal input terminal 4 and the amplifier input circuit.

The input circuit includes the primary winding 12 of a first input transformer 14. Between the resistor 8 and the upper terminal of the primary 12, there is connected in the input circuit, a pair of serially connected resistors 16 and 18. A capacitor 20 is connected in parallel with these two resistors. The extreme ends of the serially connected resistors are connected, respectively, to the two fixed contacts 22 and 24 of a vibrating switch or chopper 26. The chopper 26 has a movable blade 28 which is movable between the two fixed contacts 22 and 24. The movable blade 28 is connected to one terminal of the primary winding 30 of a second input transformer 32. The second terminal of the primary 30 is connected to the junction between the two serially connected resistors 16 and 18. The input circuit, including the serially connected resistors 16 and 18, the primary winding 12, and the chopper 28 is incased in an electrostatic shield member 34. Similarly, the primary winding 30 of the second transformer 32 is also incased in electrostatic shielding means 36. The shield member 34 is electrically connected to the upper input lead following the resistor 8 while the shield member 36 is electrically connected to the lower input lead following the resistor 10. This arrangement provides for a minimization of deleterious effects due to stray capacities in the input circuit by providing a balanced circuit therefor.

The first input transformer 14 is provided with a secondary winding 38 one terminal of which is connected to the input circuit of a direct coupled amplifier 40. The output of the amplifier 40 contitutes the system output of the herein described apparatus. More will be said of this output circuit hereinafter.

The second transformer 32 also has a secondary winding 42. This secondary winding 42 is connected as input to an alternating current amplifier 44. The output of this amplifier 44 is demodulated in a diode demodulator. The diode demodulator includes a pair of diodes 46 and 48, which may be crystal diodes, a pair of resistors 50 and 52 and alternating current means for energizing the demodulator. In the instant case, there is a source of oscillatory energy 54, which may be an oscillator. The oscillator 54 is connected to the primary winding 56 of a transformer 58. This transformer 58 is provided with two secondary windings 60 and 62. One of these windings 60 is connected to drive the demodulator and is connected across the series connection of the two resistors 50 and 52 and the two diodes 46 and 48 connected in series with respect to each other and in parallel with the two resistors. The other secondary winding 62 of the transformer 58 is connected to a driving coil 64 for actuating the chopper.

The demodulated output of the amplifier 44 is filtered in a filter network including coupling capacitor 66, a pair of filter resistors 68 and 70 and a second capacitor 72. This filtered output signal is applied to a series circuit which includes the secondary winding 38 of the transformer 14 and the input circuit of the amplifier 40. Thus the input to the amplifier 40 is a composite signal including that portion of the signal inductively coupled to the secondary 38 from the primary 12 and that portion of the signal conductively superimposed on the secondary 38 from the output of the amplifier 44.

The circuit includes both positive and negative feedback means which are connected around the entire circuit coupling the output terminals 74 and 76, back to the input circuit. The negative feedback means includes, first, a feedback resistor 78 connected between the upper output terminal 74 and the lower input lead between the input resistor 10 and the input circuit; and, second, a balance resistor 80 connected between the lower output terminal 76 or common bus 81, and the upper input lead between the input resistor 8 and the input circuit. The positive or regenerative feedback means includes, first, a feedback resistor 82 connected between the upper output terminal 74 and the upper terminal 2; and, second, a balance resistor 84 connected between the common bus 81 and the lower input terminal 4.

Since, as will be more fully set forth hereinafter, the present system is balanced, stray influences may cause disturbing errors in the output. To further minimize the effect of stray fields, the entire apparatus is housed in a double shielded case. The case comprises an inner shield shell 85 and an output shell 87. The two shells are spaced apart and electrically insulated from each other. The inner shell 85 is connected to the internal wiring as chassis ground represented by the common bus 81, while the outer shell is connected to true ground.

In operation, a desired signal to be handled, i.e. measured, used for control purposes or applied to data handling apparatus, is applied to the input terminals 2 and 4. As noted, this input signal may be derived from a strain-gage, thermocouple, or other suitable three terminal signal source. The input terminal 6 is connected to the ground connection of the signal source. The magnitude of the signal applied to the two input terminals 2 and 4 may be small compared to the magnitude of the common mode signal. From the input terminals, the signal is applied to the input circuit. Here the signal is applied as input to either of the two amplifiers. First, if the signal is an alternating signal or a signal having a changing characteristic or component, it is applied through the transformer 14 to the input of the direct coupled amplifier 40. At this point it may be noted that while the amplifier has one input and one output terminal grounded, by virtue of the transformer coupling, the input terminals are not referenced to such ground connection; that is, the input circuit is isolated from the amplifier input. The signal applied through the transformer to the amplifier 40 is amplified and applied to the output terminals 74 and 76. It will be recalled that there is a large measure of negative feedback around the loop. The amplifier 40 itself exhibits very high gain. With this combination, the amplifier tends to maintain its input at zero in the manner of operational amplifiers.

If the signal applied to the input circuit is unidirectional in nature, i.e. direct current, or has a component of very low frequency, the signals developed across the resistors 16 and 18 will be alternately sampled by the chopper 28 and applied as an alternating square wave signal to the primary 30 of the transformer 32. From the output of the transformer 32, the signal is applied as input signal to the alternating current amplifier 44. Here, the resulting alternating signal is amplified and then demodulated by the diode ring demodulator. Since the demodulator is energized by the same oscillator 54 as the chopper 28, the demodulator will be synchronously operated with respect to the chopper 28. Thus, the demodulator will produce a unidirectional signal, when filtered by the output filter, which is of the same polarity as the originally applied signal and which is proportional thereto in magnitude. This amplified, demodulated signal is then applied as an input signal to the direct coupled amplifier 40 as previously noted. In one device constructed in accordance with the present invention, the chopper and the demodulator were both operated at 400 cycles per second. In that arrangement, relationships were such that the cross-over point between the two amplifier sections occurred at about 25 cycles per second. At that frequency the gain of the transformer 14 approaches unity. For direct current signals applied through the chopper to the amplifier 44, the net gain of the amplifier is very high, on the order of 10,000. However, the effective gain falls off rapidly with increases in the frequency of the signals applied to the chopper until at about 25 cycles per second, the gain drops to unity. Thus at direct current or very low frequencies, the gain of the amplifier 44 is superimposed upon the gain of the amplifier 40. With the very heavy overall negative feedback, however, the output characteristics of the amplifier system is maintained flat. The increased gain at D.C. together with the heavy feedback helps to stabilize the system against D.C. drift occurring in D.C. amplifier 40.

As was hereinbefore pointed out, one feature of the instant invention is a high rejection of the so-called common mode signals. This common mode signal $E_c$ appears between the input terminals 6 and both of the signal input terminals 2 and 4. If the circuit is properly arranged to reject the common mode signal, there should be at the output terminals 74 and 76, no signal resulting from the influence of the common mode signal. Looking into the input of the system from the input terminals 2 and 4, the common mode signal sees the resistor 10 in series with the feedback resistor 78 in one leg. In the other leg, this signal sees the resistor 8 in series with the resistor 80. Because of the heavy negative feedback arrangement, the output of the amplifier is essentially zero and has a very low impedance to ground. If the ratio of the resistance 80 to the resistance 8 equals the ratio of the resistance 78 to the resistance 10, the voltages appearing at each of the input terminals 2 and 4, as a result of the common mode signal, will be equal. Since the amplifier system recognizes only the difference in potential on these two input terminals, the net effect is that the common mode signal is rejected. This arrangement does not prevent the circuit from operating normally with respect to the desired signal $E_s$ applied, through the internal impedance $R_a$ and $R_b$ (shown dotted), to the two input terminals. In the aforementioned device constructed in accordance with the present invention the two input resistors 8 and 10 each had a resistance of 1000 ohms while the feedback resistor 78 and the balancing resistor 80 each had a resistance of 200,000 ohms. This, it may be seen, results in an overall gain to the desired signal $E_s$ of 200 times and a gain of zero to the common mode signal $E_c$.

If only the negative feedback connections are included in the circuit, there is produced an effect which appears as a low input impedance to the desired signal. Since the signal source includes internal impedances, a voltage signal will appear across the internal impedances due to the feedback current flowing through the input resistor 10. This voltage would produce an apparent change in the input signal. This type of change is characteristic of a low input impedance. If the impedances of the source $R_a$ and $R_b$ are substantially equal, this effect may be overcome by introducing a measure of positive feedback at the opposite input terminal from that terminal to which the negative feedback is applied. This has the effect of opposing the current flow through the source due to the negative feedback with a comparable current flow in the opposite direction. To this end, the positive feedback resistor 82 is connected between the output terminal 74 and the input terminal 2. That resistor alone would then unbalance the system so far as the common mode signal $E_c$ is concerned. In order to maintain the system balanced with respect to the common mode signal, the balance resistor 84 is connected between the common bus 81, or ground, and the input terminal 4. With this arrangement the amplifier system is completely balanced with the desired signal input circuit floating. If the source of the desired signal is also balanced, that is, if the source impedance is equally distributed between the two legs connected, respectively, to the input terminals 2 and 4, then the input impedance will appear as infinite with respect to the desired input signal.

Figure 2:
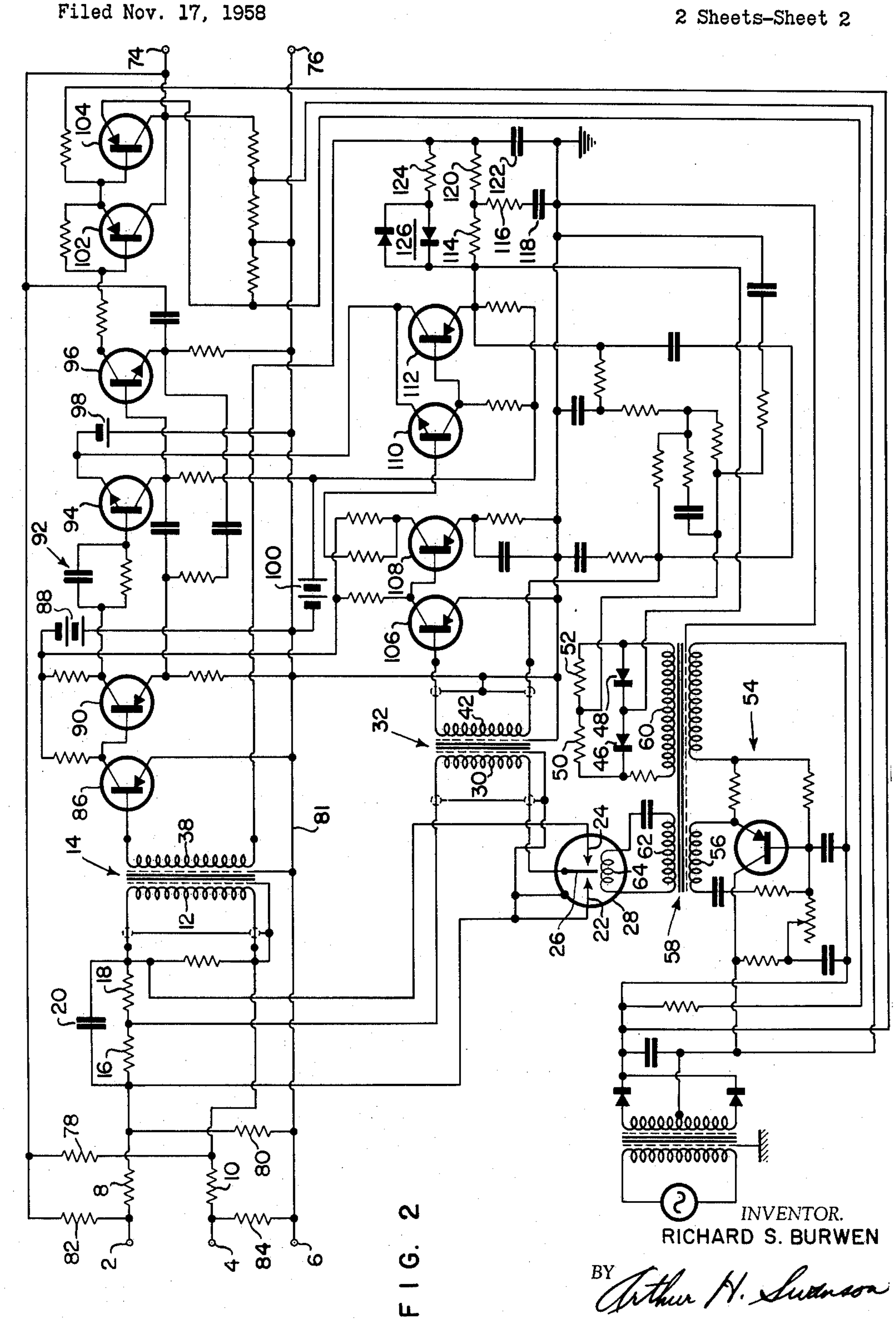
FIG. 2 is a circuit diagram illustrating the present invention in greater detail.

In FIG. 2, there is illustrated a circuit including considerably more detail than is shown in FIG. 1. In this figure, certain features and elements bear the same reference numerals as the corresponding elements or features illustrated in FIG. 1. Thus the input terminals 2 and 4 are connected, respectively, through the input resistors 8 and 10 to the input circuit which includes the series connected resistors 16 and 18 feeding into the primary winding 12 of the transformer 14. Also from the input circuit the input signal is applied to the signal converter or chopper 28, as before set forth, and thence to the primary 30 of the transformer 32.

From the secondary 30 of the transformer 14 the input signals are applied to the direct coupled amplifier which is represented in FIG. 1, as the amplifier 40. In FIG. 2, this amplifier is shown as a six-stage direct coupled transistor amplifier. The upper terminal of the secondary winding 38 is connected to the base electrode of the first stage transistor 86, the emitter of which is connected to the common bus 81. The collector of the transistor 86 is connected through a load resistor to a bias supply 88. The output of the transistor 86 is directly connected from the collector thereof to the base electrode of the next stage transistor 90. The emitter of the transistor 90 is connected through a bias resistor to the common bus 81. The collector thereof is also connected through a load resistor to the bias supply 88. The output of the transistor 90 is taken from the collector thereof through a parallel R-C network 92 to the base electrode of the third stage transistor 94. The transistor and the fourth stage transistor 96 are of the opposite conductivity type from those preceeding and following them. Thus, where the first, second, fifth and sixth stages are shown as PNP type transistors; the third and fourth stages are shown as NPN type transistors. The emitter electrode of the transistor 94 is connected through a bias supply source 98 to the common bus 81. The collector thereof is connected through a load resistor to a positive bias supply source 100. The collector of the transistor 94 is directly connected to the base electrode of the fourth stage transistor 96. The emitter of this transistor is connected through a bias resistor to the common bus 81. The collector thereof is connected through a coupling resistor to the base electrode of the fifth stage transistor 102. A bias resistor is connected between the base and the emitter of the transistor 102. The emitter is also directly connected to the base electrode of the sixth stage transistor 104. The collectors of these last two transistors are connected together and to the output terminals 74. The base and emitter electrode of the transistor 104 are suitably connected to appropriate bias supply voltages.

Returning now to the transformer 32, the chopper modulated signals applied thereto are fed from the secondary winding 42 to the input of the A.-C. amplifier represented in FIG. 1 as the amplifier 44. In FIG. 2 this amplifier is shown as a four stage transistor amplifier. The upper terminal of the secondary 42 is connected directly to the base electrode of the transistor 106, the first stage of the four stage amplifier. The emitter of this transistor is connected directly to the common bus 81; its collector is connected through a load resistor to the bias supply source 88. From the collector of the transistor 106, the output is connected directly to the base electrode of the next stage transistor 108. The emitter of this transistor is connected to the common bus through a parallel R-C circuit, while its collector is connected through a load resistor to the bias supply source 88. The output of this transistor is taken from the collector through a coupling resistor to the base electrode of the third stage transistor 110. This transistor, like the third stage above, is also of the opposite conductively type. The emitter of this transistor is connected to the bias supply source 98 while its collector is connected through a load resistor to the positive bias supply source 100. The collector output is connected directly to the base electrode of the output stage transistor 112. This stage is an emitter following stage, with the collecter connected directly to the bias supply 98. The emitter is connected through a load resistor to the positive bias supply source 100.

From the emitter of the transistor 112, the signal is demodulated by operation of the synchronous diode-demodulator, which includes the secondary winding 60 of the transformer 58, the diodes 46 and 48 and the resistors 50 and 52. This demodulated signal is passed through a ripple removing filter which includes a first series resistor 114, a shunt resistor 116 and capacitor 118, a second series resistor 120 and a shunt capacitor 122. This, it will be noted, is a two stage filter. For reasons which will appear later a one stage filter is connected in parallel with this filter and includes the resistor 124 and the diodes 126. From the filter, the demodulated signal is fed to the input of the first described amplifier by a direct connection to the lower terminal of the secondary winding 38, of the transformer 14 where it is superimposed upon any signal induced directly into the secondary 38 from the primary winding 12.

One of the principal difficulties encountered with D.-C. amplifiers and with transistor amplifiers, in connection with the amplification of small input signals, is the problem of drift from one cause or another, primarily due to temperature changes. In order to overcome this difficulty a novel arrangement has been provided. The most sensitive portion of the circuit, so far as drift is concerned, is the first stage of the amplifier, or the transistor 86. The identical characteristics of the transistor 106, the first stage of the A.-C. amplifier are used to compensate for the drift tendancies of the transistor 86. The transistor 106 is subjected to these same temperature changes as the one to be compensated. The A.-C. amplifier is, as has been noted, a four stage amplifier with the final stage being an emitter follower. A heavy negative feedback is provided around the A.-C. amplifier. This negative feedback path includes the synchronous demodulator so that the feedback signal is picked off at the emitter of the last transistor 112, passed through the demodulator, through a series of resistors to the lower end of the primary winding 42 of the transformer 32 thence to the base of the first transistor 106.

The foregoing feedback arrangement produces several desirable results. The first result is, of course, the negative feedback stabilization of the A.-C. amplifier. The second feature is that, through this arrangement, compensation is provided for the transistor 86. The sum of the base resistance of the transistor 106 is made equal the sum of the base resistances of the transistor 86. Thus the zero collector current or $I_{co}$, of the two transistors has a similar effect on the operating characteristics thereof. Also the thermal drift of the transistor 106 will be substantially the same as that of the transistor 86. Since the lower amplifier is arranged to amplify the alternating signals produced by the chopper, and the thermal drift and $I_{co}$ components would ordinarly have substantially no effect on the output of that portion of the amplifier. In the instant case, however, even this amplifier is direct coupled. Thus the effect of these D.-C. drift conditions, which appear at the output of transistor 106, are superimposed upon the chopper signal, however, in an opposite phase relationship. These signals, when amplified are applied as input to the base of the transistor 86. The desired or control signal is presented in such phase, relative to the signal applied directly thereto from the transformer 14. On the other hand, the superimposed drift component signal is presented to the base of the transistor in a phase and of a magnitude to offset the conditions of drift in the transistor 86.

The third aspect of the feedback arrangement for the lower amplifier is that it prevents overloading the output stage of this section of the amplifier. The normal operation of a synchronous demodulator is to short, on alternate half cycles, the output of the amplifier to ground. Since this is a high gain amplifier, such shorting of the output would cause an overload condition in the transistor 112. In the present case, the demodulator acts as a switch between the output of the transistor 112 and the input of the transistor 106. During the time that the switch, demodulator, is open, the transistor 112 has a very high output which includes the amplified input signal component and a component representative of the temperature compensation for the transistor 86. When the switch is closed, the output of the transistor 112 is very low due to the substantially 100% negative feedback, and contains only the temperature compensation components. Thus, when the switch is open, full signal is delivered through the filter to the input of the transistor 86; and when the switch is closed, substantially no output signal is delivered to the filter, not because of a short circuit condition, but because of the very heavy negative feedback. So far as the output to the filter is concerned, there is no apparent difference in the signal whether the output of the amplifier is apparent, however, in the operation characteristics of the output transistor. In the case of the actual short, excessive current drain will be made on the output transistor, possibly damaging it, whereas in the case of the virtual short, no appreciable current drain will be made on the transistor.

As was previously mentioned, the filter comprises a two-stage R-C network with a single stage filter connected in parallel therewith through a pair of limiting diodes 126. Inasmuch as the output of the lower or chopper amplifier is demodulated in the half-wave synchronous demodulator, it must be filtered before application to the next stage. Since the higher frequencies are not passed by the filter, these frequencies are passed directly through the transformer 14 to the input of the transistor 86. If the phase relationship between the signals applied to the transistor 86 from these two sources does not exceed a critical value, on the order of 180°, then the overall circuit feedback is in a stable condition. However, when the signal applied to the chopper amplifier goes down and the phase relationship of the signals exceeds 180°. Under such conditions, the amplifier becomes unstable, and breaks into oscillation. To overcome this condition, the single stage filter is connected in parallel with the two stage filter. Until the output of the chopper amplifier exceeds the breakdown voltage of the diodes 126, the single stage filter does not enter into the picture. However, when the breakdown voltage is exceeded, well before the saturation level is reached, the single stage filter takes over, modifying the phase relationship of the output signals to maintain the system in a stable condition.

Figure 3:
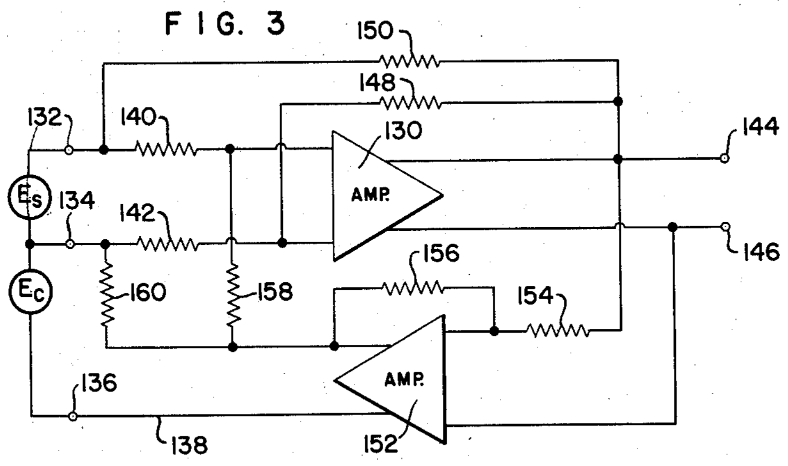
FIG. 3 is a schematic diagram of a somewhat different circuit also embodying the present invention.

In the foregoing circuit, the net gain of the amplifier system is somewhat sensitive to balance or unbalance in the source impedance. In FIG. 3 there is illustrated an arrangement, embodying the present invention, in which there is a reduced sensitivity to an unbalance in the source impedances. In that figure, the amplifiers 40 and 44 of FIG. 1, together with their input circuitry, the output demodulator and the filter are presented schematically as the amplifier 130. As before there are provided input terminals 132, 134, and 136. Of these terminals, the first two are the differential input terminals, or the terminals for the desired signal. The terminal 136 is the common terminal to which is connected the common bus 138. Between the input terminal 132 and the input of the amplifier 130 there is connected a series input resistor 140. A similar resistor 142 is serially connected between the input terminal 134 and the input to the amplifier 130. The output of this amplifier is connected to a pair of output terminals 144 and 146, the latter of which is connected to the common bus 138. As in the previously described arrangement, a negative feedback resistor 148 is connected between the output terminal 144 and the input to the amplifier, being connected between the input resistor 142 and the input circuit of the amplifier. Similarly, a positive feedback resistor 150 is connected between the output terminal 144 and the input terminal 132. Unlike the previously described arrangements, the corresponding balancing resistors are not connected between the input of the amplifier and the common bus directly. Instead, an inverting feedback amplifier 152 is inserted with its input connected to the output terminals 144 and 146. One of the connections through the amplifier 152 is, of course, the common bus 138. The other of the input leads is connected from the output terminal 144 through an input resistor 154. The output of the amplifier 152 is connected in negative feedback relation through a feedback resistor 156. As in the case of operational amplifiers, the net gain of the amplifier 152 is determined by the ratio of the value of the resistors 154 and 156. From this same output terminal of the amplifier 152, a negative feedback connection is made through a feedback resistor 158 to the input of the amplifier 130. Further, a positive feedback connection is made through a feedback resistor 160 to the input terminal 134. Instead of the resistors 158 and 160 being a part of a passive balancing circuit referred to the common bus, they are a part of an active feedback circuit. The phase or polarity of the two feedback paths are opposite since one of them includes the inverting amplifier. The feedback currents resulting therefrom flowing through the source impedance in opposite directions may be made to cancel in any desired degree. Because of this reduction in the feedback currents flowing through the source impedance, the gain characteristic of the amplifier 130 is much less sensitive to the lack of symmetry of the source impedances.

Thus there has been described an improved amplifier capable of handling wide band signals which features a high rejection to common mode signals and a high impedance to desired differential input signals.

What is claimed is:

1. An electronic amplifier system for differential input signals, said system comprising an amplifier having a first and a second input terminal and an output circuit having a first and a second output terminal, a first and a second system differential-signal input terminal and a common input terminal, said common terminal being connected to one of said output terminals of said amplifier output circuit by a common bus, a first input impedance connected between said first system input terminal and said first amplifier input terminal, a second input impedance connected between said second system input terminal and said second amplifier input terminal, a feedback impedance connected in degenerative feedback relation between the other of said output terminals of said amplifier output circuit and said second amplifier input terminal, and a balance impedance connected between said first amplifier input terminal and one of said output terminals of said amplifier output circuit, said first and second input impedances, said feedback impedance and said balance impedance forming a balanced circuit with respect to common-mode signals whereby to reject said common-mode signals from the operation of said amplifier.

2. The invention set forth in claim 1 wherein an inverting amplifier stage is connected to said first output terminal of said first mentioned amplifier and said balance impedance is connected between the output of said inverting amplifier and said first input terminal of said first mentioned amplifier.

3. An electronic amplifier system for differential input signals, said system comprising an amplifier having a first and a second input terminal and an output circuit having a first and a second output terminal, a first and a second system differential signal terminal and a common input terminal, said common terminal being connected to one of said output terminals of said amplifier output circuit by a common bus, a first input impedance connected between said first system input terminal and said first amplifier input terminal, a second input impedance connected between said second system input terminal and said second amplifier input terminal, a feedback impedance connected in degenerative feedback relation between the other of said output terminals of said amplifier output circuit and said second amplifier input terminal, and a balance impedance connected between said first amplifier input terminal and the one of said output terminals of said amplifier output circuit, said first and second impedances, said feedback impedance and said balance impedance forming a balanced circuit with respect to common-mode signals whereby to reject said common-mode signals from the operation of said amplifier, said amplifier including a direct coupled first amplifier section and an alternating signal second amplifier section, an amplifier input circuit connected between said amplifier input terminals and said amplifier sections including a first input transformer having a primary winding and a secondary winding connected to couple said input circuit to said first amplifier section, a signal chopper modulator and a second input transformer having a primary winding and a secondary winding connected to couple said input circuit to said second amplifier section, a synchronous demodulator connected to demodulate the output of said second amplifier section, and means connecting the demodulated output of said second amplifier section directly to the input of said first amplifier section.

4. The invention as set forth in claim 3 wherein there is included in the connection between said demodulator and the input to said first amplifier section a first filter means and a second filter means, and further included in said connection signal level responsive means operative to effectively exclude said second filter means unless the output signal from said second amplifier section exceeds a predetermined voltage level.

5. The invention as set forth in claim 3 wherein there is included in the connection between said demodulator and the input to said first amplifier section a first filter means and a second filter means effectively connected in parallel with said first filter means, said second filter means including in series therewith a pair of voltage limiting diodes whereby said second filter means is effectively excluded from operation unless the output signal of said second amplifier section exceeds a predetermined voltage level.

6. The invention as set forth in claim 3 wherein said first and second amplifier sections are transistor amplifiers.

7. The invention as set forth in claim 3 wherein said synchronous demodulator includes means for alternately on half-cycles effectively connecting the output of said second amplifier section to the input thereof.

8. The invention as set forth in claim 7 wherein said first and second amplifier sections are direct coupled multi-stage transistor amplifiers and further wherein the operating characteristics of the first stage of said transistor amplifiers are matched whereby the operation of said second section provides compensation for drift tendencies of said first section through said connection from the output of said second amplifier section to the input of said first amplifier section.

9. An electronic amplifier system for differential input signals, said system comprising an amplifier having a first and a second input terminal and an output circuit including a first and a second output terminal, a first and a second system input terminal for differential input signals and a common input terminal, said common terminal being connected to one of said output terminals of said amplifier output circuit by a common bus, a first input impedance connected between said first system input terminal and said first input terminal of said amplifier, a second input impedance connected between said second system input terminal and said second input terminal of said amplifier, a first feedback impedance connected in degenerative feedback relationship between the other of said output terminals of said amplifier output circuit and said second input terminal of said amplifier, a second feedback impedance connected in regenerative feedback relation between said other of said output terminals of said amplifier output circuit and said first system input terminal, a first balance impedance connected between the one of said output terminals of said amplifier output circuit and said first input terminal of said amplifier, and a second balance impedance connected between said one of said output terminals of said amplifier output circuit and said second system input terminal, said first and second input impedances, said first and second feedback impedances and said first and second balance impedance forming a balanced circuit with respect to common-mode signals whereby to reject said common-mode signals from the operation of said amplifier.

10. The invention as set forth in claim 9 wherein said impedances are resistors.

11. The invention as set forth in claim 10 wherein the connection of said balance resistors is to said second output terminal of said amplifier output circuit and includes said common bus.

12. The invention as set forth in claim 10 wherein an inverting amplifier stage is connected to said first output terminal of said amplifier output circuit, and said balance resistors are connected to the output of said inverting amplifier.

13. A chopper stabilized electronic amplifier comprising signal chopper for modulating low frequency input signals, an electronc amplifier, a coupling transformer coupling said chopper to the input of said amplifier, a cyclically operating synchronous demodulator connected selectively to couple the input and output of said electronic amplifier, said demodulator alternately defining first and second paths for the output of said electronic amplifier during opposite half cycles of its operation, said first path being connected as an output circuit for said chopper stabilized amplifier, and said second path being connected in negative feedback relation to the input of said amplifier.

References Cited in the file of this patent

UNITED STATES PATENTS

| | | |
|---|---|---|
| 2,167,368 | Meyers | July 25, 1939 |
| 2,497,129 | Liston | Feb. 14, 1950 |
| 2,648,727 | Rockwell | Aug. 11, 1953 |
| 2,688,729 | Offner | Sept. 7, 1954 |
| 2,801,296 | Blecher | July 30, 1957 |
| 2,856,468 | Berry | Oct. 14, 1958 |

OTHER REFERENCES

Publication, Wireless World, Nov. 1956, page 98, "Transistor High Gain Preamplifier," (1658).